US008758498B2

(12) United States Patent
Zastrau et al.

(10) Patent No.: US 8,758,498 B2
(45) Date of Patent: Jun. 24, 2014

(54) SILANES BLEND

(75) Inventors: Ralf Zastrau, St. Ingbert (DE); Rolf Danzebrink, St. Ingbert (DE); Peter Cheshire Hupfield, Carmathen (GB); Samantha J. Reed, Cardiff (GB)

(73) Assignee: Dow Corning Corporation, Midland, MI (US)

( * ) Notice: Subject to any disclaimer, the term of this patent is extended or adjusted under 35 U.S.C. 154(b) by 704 days.

(21) Appl. No.: 13/124,481

(22) PCT Filed: Oct. 7, 2009

(86) PCT No.: PCT/EP2009/063054
§ 371 (c)(1),
(2), (4) Date: Jul. 5, 2011

(87) PCT Pub. No.: WO2010/043529
PCT Pub. Date: Apr. 22, 2010

(65) Prior Publication Data
US 2011/0253007 A1 Oct. 20, 2011

(30) Foreign Application Priority Data

Oct. 16, 2008 (EP) .................................. 08166758
Oct. 7, 2009 (EP) .................. PCT/EP2009/063054

(51) Int. Cl.
*C09D 183/08* (2006.01)
*C04B 41/49* (2006.01)
*C04B 41/00* (2006.01)
*C08G 77/26* (2006.01)

(52) U.S. Cl.
CPC ............ *C09D 183/08* (2013.01); *C04B 41/009* (2013.01); *C08G 77/26* (2013.01); *C04B 41/4933* (2013.01)
USPC .................................................. 106/287.11

(58) Field of Classification Search
CPC ............. C09D 183/08; C04B 41/4944; C04B 41/4933
USPC .................................................. 106/287.11
See application file for complete search history.

(56) References Cited

U.S. PATENT DOCUMENTS

| 3,355,424 | A |   | 11/1967 | Brown |
|---|---|---|---|---|
| 5,030,745 | A |   | 7/1991 | Weber et al. |
| 5,442,011 | A |   | 8/1995 | Halling |
| 5,739,369 | A | * | 4/1998 | Matsumura et al. .......... 556/425 |
| 5,849,942 | A |   | 12/1998 | Standke et al. |
| 5,883,185 | A |   | 3/1999 | Matsumura et al. |
| 6,054,601 | A |   | 4/2000 | Standke et al. |
| 6,251,989 | B1 |   | 6/2001 | Edelmann et al. |
| 6,491,838 | B1 |   | 12/2002 | Standke et al. |
| 6,582,620 | B2 |   | 6/2003 | Miyadai et al. |
| 7,026,398 | B2 |   | 4/2006 | Monkiewicz et al. |
| 7,344,235 | B2 |   | 3/2008 | Soga et al. |
| 7,985,798 | B2 | * | 7/2011 | Danzebrink et al. ............ 525/38 |
| 2003/0186066 | A1 | * | 10/2003 | Monkiewicz et al. ........ 428/447 |
| 2006/0193988 | A1 | * | 8/2006 | Walter et al. .................. 427/387 |
| 2008/0281054 | A1 |   | 11/2008 | Danzebrink et al. |

FOREIGN PATENT DOCUMENTS

| EP | 0078548 A2 | 5/1983 |
|---|---|---|
| EP | 0738771 B1 | 7/2001 |
| WO | 2004076718 A1 | 9/2004 |
| WO | WO2007048745 A1 | 10/2006 |

OTHER PUBLICATIONS

English Language Abstract for European Publication No. EP 0078548 extracted from the espacenet.com database on Dec. 13, 2011, 29 pages.
English Language Abstract for PCT Publication No. WO 2004/076718 extracted from the espacenet.com database on Dec. 13, 2011, 54 pages. Also see English language equivalent US2006/0193988.
Data Sheet for TEGO DISPERS wetting and dispersing additives. EVONIK Industries. Pertinent passage: footnote to table indicates TEGO DISPERS 610 S is a silicone containing compound. Extracted from www.tego.de/product/tego/en/products/additives/wetting-dispersing-additives/pages/ . . . Jun. 17, 2011, 1 page.
Upham, B. L., Deocampo, N. D., Wurl, B. and Trosko, J. E. (1998), "Inhibition of gap junctional intercellular communication by perfluorinated fatty acids is dependent on the chain length of the fluorinated tail." International Journal of Cancer, 78: 491-495.
Alexander, B. H.; Olsen, G. W.; Burris, J. M.; Mandel, J. H.; Mandel, J. S.; (2003), "Mortality of employees of a perfluorooctanesulphonyl fluoride manufacturing facility." Occupational Environmental Medicine, 2003, vol. 60, issue 10, p. 722-729.
PCT International Search Report for PCT/EP2009/063054 dated Jan. 18, 2010, 3 pages.

\* cited by examiner

*Primary Examiner* — David M Brunsman
(74) *Attorney, Agent, or Firm* — Howard & Howard Attorneys PLLC

(57) ABSTRACT

The present invention relates to a composition comprising at least two fluorosilanes and at least one aminosilane, a condensation product of said fluorosilanes and said aminosilane, and a surface protective agent made thereof.

19 Claims, 1 Drawing Sheet

| Ranking | Stain |
|---|---|
| 0 | 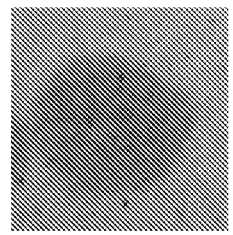 |
| 1 | 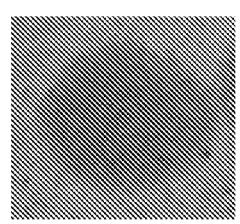 |
| 2 | 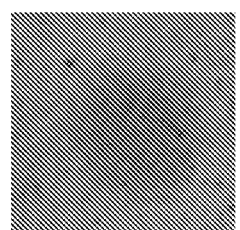 |
| 3 | 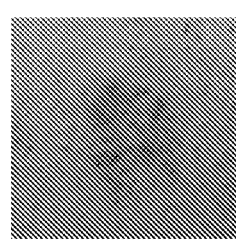 |
| 4 | 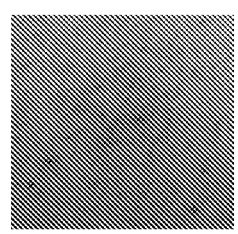 |
| 5 | 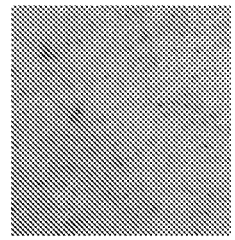 |

SILANES BLEND

The present invention relates to a composition comprising at least two different fluorosilanes and an aminosilane, a condensation product of said fluorosilanes and said aminosilane, and a surface protective agent made thereof.

Silanes are used for building protection as anti-corrosives, anti-graffiti-agents and water-repellents on substrates such as marble, sandstone, concrete, granite, sand-limestone, terracotta, clinker, split-face block or bricks. For such applications, the treatment products need to be preferably water-based and slightly acidic.

Fluorinated silanes exhibit the best performance with regard to simultaneous water-repellence and oil-repellence. Such fluorinated silanes so far possess several drawbacks. First of all, they do not easily form stable solutions, emulsions or dispersions with solvents having a dielectric constant greater than 30 at 20° C. Secondly, most of the fluorinated silanes used for building protection may release perfluorooctanoic acid (PFOA), which has been found to persist and bioaccumulate in animal and human tissue and to accumulate in the liver where it inhibits glutathione peroxidase, a selenoprotein essential for thyroid hormone conversion, thereby also causing cancer (Occup Environ Med 60(10):722-9 (2003); Int J Cancer 78(4):491-5 (1998)).

U.S. Pat. No. 6,054,601 A discloses compositions of long-chain perfluorinated silanes and aminosilanes that undergo a reaction in aqueous media.

EP 0738771 A1 discloses aqueous compositions comprising long-chain perfluorinated silanes and aminosilanes. Compositions comprising less than 90% water are described to possess shelf instability.

U.S. Pat. No. 5,442,011 A discloses compositions of long-chain perfluorinated silanes and aminosilanes that undergo a reaction in aqueous media.

WO 2007/048745 A1 discloses a mixture of a fluorosilane and an aminosilane.

Therefore, the problem underlying the present invention finally is to provide a stable and non-toxic surface protective agent resulting in good water- and oil-repellence deliverable in a solvent system with a high dielectric constant.

In a first embodiment, the problem underlying the present invention is solved by a reactive composition comprising, in particular consisting of (a) at least two different fluorosilanes each of the same general formula I

$$R_{tf}\text{—}SiX_3 \quad \text{(formula I)},$$

wherein
X is selected from the group of alkoxy, halide, oxime, carboxyl, phenoxide and polyether, and
$R_{tf}$ is a straight, branched or cyclic residue of the general formula II or III $$\text{—Y—}R_f \quad \text{(formula II) or}$$

$$\text{—Y—}(SiR_1R_2O)_xSiR_1R_2\text{—Y—}R_f \quad \text{(formula III)},$$

wherein
Y is a divalent organic moiety selected from the group of —$(CH_2)_n$—, —$CO_2$—, —O—, —CONH—, -Ph-, —$SO_2$—, and —$SO_2NH$—, wherein n is an integer from 1 to 30,
$R_f$ is a C2 to C7 linear or branched perfluoroalkylene group, wherein said fluorosilanes differ in their number of carbon atoms in $R_f$ at least by 2,
$R_1$ and $R_2$ are independently selected from monovalent organic residues, x is an integer from 0 to 5, and
(b) and at least one aminosilane of the general formula IV

$$R_a\text{—}SiR_3R_4R_5 \quad \text{(formula IV)},$$

where
$R_a$ is a straight, branched or cyclic alkyl residue comprising 1 to 7 carbon atoms and at least one primary, secondary, ternary or quaternary, preferably being protonated, amino-group,
$R_3$ and $R_4$ are independently selected from —$R_a$, —$OR_6$ and/or —$R_6$, and
$R_5$ is —$OR_6$, and
$R_6$ is a straight, branched or cyclic alkyl residue comprising 1 to 3 carbon atoms.

Protonated in the sense of the invention does not necessarily mean a positive charge on the nitrogen atom. It just means that at least one hydrogen atom is connected to the nitrogen atom.

Advantageously, the two different fluorosilanes are present in a weight ratio of the fluorosilane with an $R_f$-group with less carbon atoms to the fluorosilane with an $R_f$-group with more carbon atoms between 0.7 to 1.3. Surprisingly it has been found that such mixture of fluorosilanes results in a much better hydrophobicity and oleophobicity than expected.

Until now it was known that e.g. a fluorosilane according to the invention with $R_f$ being $C_6F_{13}$ performs much better than a fluorosilane according to the invention with $R_f$ being $C_4F_9$. However, it is also known that fluorosilanes with even number of carbon atoms are more expensive the longer the carbon chain is. As far as hydrophobic and oleophobic performance of mixtures of fluorosilanes are concerned, it should be expected that the performance behaves linearly depending on the weight ratio of the different silanes.

Surprisingly, the inventors have found that e.g. an even mixture by weight of a fluorosilane according to the invention with $R_f$ being $C_6F_{13}$ and a fluorosilane according to the invention with $R_f$ being $C_4F_9$ performs nearly as good as a fluorosilane according to the invention with $R_f$ being $C_6F_{13}$ alone and much better than the expected performance-level midway between both silanes. These findings have been confirmed with numerous experiments conducted and reported under the section "Examples".

Preferably, $R_f$ is a linear perfluoroalkylene group and independently therefrom is a C4 and a C6 group for the at least two different silanes, respectively.

The composition according to the present invention is preferably non-aqueous. "non-aqueous" in the sense of the present invention means that no additional water is added. This does not exclude usual water traces in the starting materials, but excludes the addition of water to the reaction system. The claims pertain to the undiluted composition with no added water. This also does not exclude addition of water at a later stage. This has the advantage of less weight and easier handling over the compositions of the prior art, since these known compositions cannot be obtained without dilution with water. In addition, it was surprisingly found that shelf-life is much better without added water.

Preferably, the composition comprises less than 1 wt. % water, particularly preferred less than 0.1 wt. % water. This is of particular advantage, since it has been found that a composition comprising water will lead to mostly non-hydrolysable condensation products and surface protective agents. Compared to the findings of EP 0738771 A1, surprisingly it has been found that compared to the stable solutions in water with fluorosilanes with at least 8 carbon atom in the fluorinated chain such as the compositions in EP 0738771 A1, the non-aqueous compositions according to the present invention exhibit a high stability and shelf-life with fluorinated allylsilanes with carbon chain lengths of less than 8 carbon atoms due to their low water content.

$R_5$ and $R_6$ are preferably the same or different. Examples of such groups are C1 to C30 linear or branched alkylene group, an aromatic containing group, an aminoalkyl containing group, and a fluoroalkyl containing group.

Advantageously, X is a halide selected from the group of F, Br, Cl and I, an alkoxide $OR_7$ wherein $R_7$ is a C1 to C22 linear or branched alkylene group, an oxime $R_8R_9C=N-O$, wherein $R_8$ and $R_9$ are independently selected from C1 to C30 linear or branched alkylene groups, wherein $R_8$ and $R_9$ may be same or different, a carboxyl residue $R_{10}CO_2$ wherein $R_{10}$ is a C1 to C30 linear or branched alkylene group, a phenoxide M-Ph-O—, where M is hydrogen or a monovalent organic group, or a polyether selected from the group of polyalkylene oxides containing one or more of the following repeating structural units $(CH_2CH_2O)_q$, or $(CH_3CHCH_2O)_q$ wherein q is a value in the range from 1 to 100, terminated by a C1 to C30 linear or branched alkylene group.

Preferably, Y is a moiety selected from the group of $-(CH_2)_o-$, $-CO_2-$, $-(CH_2)_o-CO_2-(CH_2)_m-$, $-(CH_2)_o-O-(CH_2)_m$, $-(CH_2)_o-CONH-(CH_2)_m$, $-(CH_2)_o-Ph-(CH_2)_m$, $-(CH_2)_o-SO_2-(CH_2)_m$, and $-(CH_2)_o-SO_2NH-(CH_2)_m$, $-SO_2-O-$, $-SO_2NH-$, $-CH_2=CH-$, and $-CH_2=CH-(CH_2)_o-$, wherein o is a number in the range from 1 to 30 and m is a number in the range from 0 to 30, in particular wherein the divalent organic group may also contain branched alkylene groups.

$Y-R_f$ may preferably comprise a unit of a starting olefin and preferably is a residue selected from the group

| | |
|---|---|
| $(CH_2)_2R_f$, | $CH_2=CH-R_f$, |
| $(CH_2)_6R_f$, | $CH_2=CH(CH_2)_4 R_f$, |
| $(CH_2)_3O(CH_2)_2R_f$, | $CH_2=CHCH_2O(CH_2)_2R_f$, |
| $(CH_2)_{10}CO_2(CH_2)_2R_f$, | $CH_2=CH(CH_2)_8CO_2(CH_2)_2R_f$, |
| $(CH_2)NHCOR_f$, and | $CH_2=CHCH_2NHCOR_f$. |

$R_f$ is a C2 to C7 linear or branched perfluoroalkylene group, in particular selected from the group $CF_3CF_2$, $CF_3(CF_2)_3-$, $(CF_3)_2CF-$, $C_4F_9-$ or $C_6F_{13}-$. Preferably, $R_f$ comprises 3 to 7 carbon atoms.

The invention is of particular advantage, if $R_f$ comprises 4 and 6 carbon atoms for each fluorosilane, respectively, since then the resulting surface protective agent will definitely not release PFOA, and since oil-repellence was found to be best in this range.

Preferably, in the composition the molar ratio of $R_f$-groups of formula I to amino-groups present in formula IV is in a range from 2:1 to 6:1, particularly in a range from 2, 5:1 to 4:1. This ratio has been found to be particularly stable in solution with solvents having a dielectric constant of at least 30 measured at 20° C. in case of such molar ratios.

$R_a$ favorably comprises at least as many carbon atoms as the longest residue of said fluorosilane, since this has been found to yield the most stable solutions, emulsions or dispersions.

Preferably, at most one, in particular none of residues X is $R_f$ or $-CH_2-CH_2-R_f$ and/or at most one, in particular none of $R_3$, $R_4$ and $R_5$ is $R_a$, since then high hydrophobicity of the treated surface material could be achieved together with good stability of the treatment solution, emulsion or dispersion.

Said fluorosilanes may advantageously be present in the composition in a range from 40 to 75 weight % and said aminosilane may advantageously be present in the composition in a range from 10 to 30 weight %.

Preferably, the composition according to the present invention comprises at least one acid in a range between 1 to 90 wt. %, even more preferred in a range between 20 and 50 wt. %, most preferred in a range between 30 and 40 wt. %.

The composition according to the present invention may comprise an additional solvent system comprising a single solvent or a mixture of solvents, where the solvent system has a dielectric constant of at least 30 measured at 20° C. Of particular advantage is a solvent or solvent mixture selected from the group of alcohols, acetone, water, ethers or N-methylformamide. Said solvent system may preferably be present in the composition in a range from 4 to 20 weight %.

X, $R_3$, $R_4$, and/or $R_5$ are preferably alkoxy groups, in particular ethoxy or methoxy groups, since then the resulting condensation product exhibits a higher stability due to better crosslinking between said fluorosilane and said aminosilane.

Said amino group is preferably a terminal group, in case the residue is not cyclic, i.e. the amino group is attached to a primary carbon atom with only one bond to another carbon atom. The amino group may preferably be $-NH_2$ or substituted, in particular with one or two $-CH_2CH_2NH_2$, phenyl groups or cyclohexyl groups. Preferably, the amino group is attached to a straight alkyl chain. These features result in particularly stable solutions, emulsions or dispersions.

Said aminosilane according to the present invention preferably comprises in the complete molecule 4 to 17 carbon atoms, 1 to 4 nitrogen atoms, 2 to 5 oxygen atoms, and 13 to 37 hydrogen atoms. The boiling point thereof is preferably in a range between 100 and 280° C., whereas the molecular weight thereof is preferably in a range from 170 to 270 g/mol. The flash point thereof is preferably in a range between 70 to 120° C. Such aminosilane is of advantage, since it poses no fire hazard during normal handling and at the same time results in optimal hydrophobicity of the resulting coating in combination with the fluorosilane.

In a further embodiment, the problem underlying the present invention is solved by a process preparing a reactive composition by combining the fluorosilanes and an aminosilane each according to the composition of the present invention followed by an acid treatment. The reaction time for protonation is preferably in a range from 1 to 20 min, even more preferred in a range from 5 to 15 min. The reaction temperature is preferably in a range of from 40 to 80° C., even more preferred in a range of from 60 to 75° C.

In a further embodiment, the problem underlying the present invention is solved by a condensation product of the fluorosilanes of the general formula I with residues as defined in general formulas II and/or III and an aminosilane of the general formula IV (master batch), obtainable by a catalytic promoted treatment of a mixture of said fluorosilanes and said aminosilane, in particular by an acid treatment.

Preferably, this condensation product is non-aqueous. Preferably, the condensation product only exists in a chemical system comprising less than 1 wt. % water, particularly preferred less than 0.1 wt. % water. Surprisingly, it has been found that only a non-aqueous reaction product is water hydrolysable at a later stage (e.g. as part of a surface protective agent). Also, such reaction product has been found to be much more stable (shelf-life) compared to condensation products produced in an aqueous system.

Preferably, said condensation product is clear and exhibits a haze value of at most 10%. The haze can be measured according to ASTM D 1003 using 10 mm thick samples of solution, e.g. in cuvettes.

It is of particular advantage, if one or more of the fluorosilanes undergo the condensation reaction in the presence of a further hydrophilic silane. It is of also particular advantage, if one or more of the fluorosilanes undergo the condensation reaction in the presence of no additional water, i.e. a non-aqueous system. Preferably this hydrophilic silane is a polar material with a dielectric constant of at least 5. Preferably this silane may also comprise monovalent organic groups Z such as epoxide groups. The molar ratio of the fluorosilanes to the hydrophilic silane is preferably in a range from 20 to 1. The hydrophilic silane is conforming with the general formula

$R_{11}R_{12}MeSi—Y—Z$    (formula VI), where $R_{11}$ and $R_{12}$ are independently selected from the group of $R_3$ or Me, and
Z is a polar monovalent organic group.

Said condensation product according to the present invention exhibits high stability toward the chemical environment due to the fluorosilanes and the aminosilane crosslinked with each other, and at the same time results in highly stable solutions, emulsions or dispersions thereof, while still providing highly hydrophobic and oleophobic surface materials treated with such condensation product.

Preferably, the acid used exhibits a $pK_a$ value in a range from 3 to 7, particularly in a range from 3.5 to 5.5. If the $pK_a$ value is too low, the degree of crosslinkage is too high, insoluble or indispersible particles of too large size are built. If the $pK_a$ value is too high, the degree of crosslinkage is insufficient to form stable solutions, emulsions and dispersions.

The acid is a Lewis acid or a Bronsted acid preferably selected from the group of boric acid, aceto acetic acid, citric acid, crotonic acid, formic acid, fumaric acid, glyceric acid, glycolic acid, lactic acid, malic acid, tartaric acid, and/or acetic acid.

The shape of the condensation product is preferably particles, in particular particles with a medium particle size in a range from 1 to 1000 nm, in particular in a range from 5 to 100 nm. The monodispersity of the condensation product is preferably in a range from 1 to 15 nm. In case the particle size is too large, the penetration into a substrate to be coated becomes worse. Also the stability of a dispersion, e.g. in form of a surface protective agent, containing such larger than preferred particles suffers.

The condensation product preferably exists within a solvent system. This solvent system preferably exhibits a pH in the range from 4 to 5. This pH is preferably accomplished by addition of a Lewis acid or a Bronsted acid.

In a further embodiment, the problem underlying the present invention is solved by a process for obtaining a condensation product according to the invention, characterized in that it comprises at least the step of adding an acid to the composition according to the invention.

Preferably, this process is a non-aqueous process, i.e. a process, in which no additional water is added.

Preferably, the weight ratio of the acid to be added to the composition according to the invention is in a range between 1:1 to 1:4, in particular in a range between 1:1.5 to 1:2.5. In view of the exothermic crosslinkage reaction, preferably no extra heat is provided during or before addition of the acid to prevent degradation of sensitive ingredients also present in the composition.

In a further embodiment, the problem underlying the present invention is solved by a process for the preparation of the fluorosilanes according to formula I with residues as defined in formulas II and/or III, characterized by the steps of hydrosilylation of an unsaturated C—C or C—O bond and following alkoxylative substitution of residues attached to the silicon atom after hydrosilylation.

In a further embodiment, the problem underlying the present invention is solved by a surface protective agent comprising said composition according to the invention and/or the condensation product according to the invention further comprising common additives for surface protective agents.

For the first time, a surface protective agent is provided comprising fluorosilanes suitable for a highly polar solvent system.

Preferably, the surface protective agent according to the present invention comprises active components in a range from 20 to 40 wt. %. Active component is preferably the condensation product according to the present invention.

Said surface protective agent according to the present invention may preferably comprise a solvent or a mixture of solvents, where the solvent or the mixture of solvents has a dielectric constant of at least 30 measured at 20° C. Of particular advantage is a solvent or solvent mixture selected from the group of alcohols, acetone, water, ethers or N-methylformamide. Such high dielectric constant solvent system has been found to adsorb to and infiltrate best polar surface materials such as for example concrete or limestone. Preferably this solvent or mixture of solvents is present in the surface protective agent in an amount in the range from 60 to 80 wt. %.

For this purpose, the surface protective agent according to the present invention preferably comprises at most 5 weight % of solvents with a dielectric constant up to 29 measured at 20° C. and at the same time comprises at least 10, in particular at least 90 weight % of solvents with a dielectric constant of at least 30 measured at 20° C.

Said surface protective agent preferably comprises 0.1 to 10 weight % of known additives such as a compound or mixture of compounds selected from the group of silicones/siloxanes, acrylic compounds, melamine derivatives, and waxes for better adhesion to the surface material as well as improved hydrophobicity and oleophobicity of the impregnated surface material.

Preferably, the surface protective agent according to the present invention exhibits a pH value in a range from 3 to 6.5 to have best compatibility with and efficiency on the substrate such as for example sandstone, limestone or concrete.

The invention is of particular advantage, if the additives are selected from the group acrylics, waxes, silicones, extenders, and polyurethanes. Preferably, the additives are present in an amount from 0.5 to 5 weight % to improve the overall performance.

Said surface protective agent preferably comprises a diluted solution, emulsion, or dispersion of the composition and/or the condensation product according to the invention for best hydrophobicity and oleophobicity of the impregnated surface materials while at the same time providing the surface protective agent as a stable solution, emulsion or dispersion. Preferably, said surface protective agent comprises an amount of 0.1 to 15, preferably 1 to 7% by weight of fluorinated compounds namely of said fluorosilanes or of the master batch or the composition or the condensation product according to the present invention.

A stable solution, emulsion or dispersion in the sense of the present invention refers to a solution, emulsion or dispersion exhibiting no significant precipitation or phase separation during storage at room temperature and normal pressure for seven days, preferably for 5 weeks (shelf-life).

In a further embodiment, the problem underlying the present invention is solved by a method for obtaining the surface protective agent according to the present invention comprising at least the step of mixing said composition or condensation product with a solvent system having a dielectric constant of at least 30 measured at 20° C. and additional additives.

In a last embodiment, the problem underlying the present invention is solved by a surface material treated with said surface protective agent according to the present invention.

Said surface material is preferably selected from the group natural stone, marble, sandstone, concrete, granite, sand limestone, terracotta, clinker, split-face block or brick.

The composition according to the present invention may be used for coatings (with e.g. greaseproof, food-release, easy-clean, anti-stain, oil- or water-repellent effect) on natural or artificial stone, on decorative elements such as walls, on household furnishing, on textile material such as woven, non-woven, or carpets, on leather, on plastics, on glass, on metal (e.g. as a mould release coating), on ceramic, on wood or on paper. The surface protective agent according to the present invention is particularly useful as a building protective agent.

The oleophobicity and hydrophobicity of the treated surface material is evaluated using contact angle measurement. The contact angle of linseed oil against air on the treated surface material is at least 50°, whereas the contact angle of water against air on the treated surface material is at least 100°. The contact angle can be measured at room temperature and normal pressure using sessile drop measurement of drops with a volume of 0.5 ml using a DSA 100 (Krüss GmbH).

EXAMPLES

Abbreviations

FTS=3,3,4,4,5,5,6,6,7,7,8,8,8-Tridecafluoroctyltriethoxysilane ($R_f$=$C_6F_{13}$)
3958=Nonafluorohexyl-1,1,2,2-H-trimethoxysilane ($R_f$=$C_4F_9$)
AMMO=3-Aminopropyltrimethoxysilane
HAC=acetic acid (100% (glacial acetic acid)
B2858=heptafluoroisohexyl-1,1,2,2,3,3-H-trimethoxysilane
FPM938=contains 48 weight % 3958, 16 weight % AMMO and 36 weight % HAC
BPS939=contains 48 weight % FTS, 16 weight % AMMO and 36 weight % HAC
10 different batches of FPM938, BPS939 and mixtures thereof are compared with regard to their hydrophobicity and oleophobicity performance.

As a general guide, the batches are more or less composed of
94.9 g demineralized water,
2.5 g of fluorosilane(s),
1.3 g Perlite and
1.3 g Plextol.

Perlite is available from various vendors and is a volcanic glass.

Plextol is an aqueous suspension of thermoplastic acrylic polymers.

The following tables show the composition of the different batches of silanes.
BPS939-Batches:

| batch number | m(water) | m(BPS 939) | m(Perlite) | m(Plextol) |
|---|---|---|---|---|
| 001 | 94.92 g | 2.50 g | 1.40 g | 1.35 g |
| 002 | 94.95 g | 2.60 g | 1.36 g | 1.40 g |
| 003 | 95.02 g | 2.54 g | 1.30 g | 1.38 g |
| 004 | 94.90 g | 2.57 g | 1.35 g | 1.40 g |

-continued

| batch number | m(water) | m(BPS 939) | m(Perlite) | m(Plextol) |
|---|---|---|---|---|
| 005 | 94.89 g | 2.62 g | 1.30 g | 1.32 g |
| 006 | 94.90 g | 2.51 g | 1.31 g | 1.28 g |
| 007 | 94.96 g | 2.50 g | 1.31 g | 1.39 g |
| 008 | 94.96 g | 2.48 g | 1.39 g | 1.33 g |
| 009 | 94.92 g | 2.47 g | 1.30 g | 1.42 g |
| 010 | 94.91 g | 2.60 g | 1.30 g | 1.36 g |

FPM338 Batches:

| Chargennummer | m(VE-Wasser) | m(FPM 938) | m(Perlit) | m(Plextol) |
|---|---|---|---|---|
| 011 | 94.96 g | 2.50 g | 1.28 g | 1.30 g |
| 012 | 94.90 g | 2.45 g | 1.27 g | 1.40 g |
| 013 | 94.91 g | 2.51 g | 1.29 g | 1.43 g |
| 014 | 94.90 g | 2.60 g | 1.32 g | 1.28 g |
| 015 | 94.95 g | 2.58 g | 1.30 g | 1.25 g |
| 016 | 94.99 g | 2.48 g | 1.31 g | 1.25 g |
| 017 | 94.93 g | 2.46 g | 1.35 g | 1.39 g |
| 018 | 94.95 g | 2.55 g | 1.29 g | 1.33 g |
| 019 | 95.01 g | 2.48 g | 1.30 g | 1.28 g |
| 020 | 94.97 g | 2.43 g | 1.29 g | 1.30 g |

Blend Batches:

| batch number | m(water) | m(BPS 939/FPM 938) | m(Perlite) | m(Plextol) |
|---|---|---|---|---|
| 021 | 94.91 g | 1.32 g/1.30 g | 1.35 g | 1.37 g |
| 022 | 95.00 g | 1.25 g/1.23 g | 1.35 g | 1.37 g |
| 023 | 94.87 g | 1.21 g/1.30 g | 1.25 g | 1.25 g |
| 024 | 94.89 g | 1.23 g/1.26 g | 1.33 g | 1.30 g |
| 025 | 94.90 g | 1.30 g/1.25 g | 1.39 g | 1.32 g |
| 026 | 94.92 g | 1.21 g/1.30 g | 1.27 g | 1.25 g |
| 027 | 94.94 g | 1.27 g/1.25 g | 1.31 g | 1.28 g |
| 028 | 94.95 g | 1.32 g/1.30 g | 1.32 g | 1.41 g |
| 029 | 94.94 g | 1.22 g/1.28 g | 1.26 g | 1.30 g |
| 030 | 94.96 g | 1.29 g/1.24 g | 1.35 g | 1.35 g |

For coating of sand-lime brick, these are first brushed off. Three evenly spaced areas are defined on the bricks, which are 8 cm×11 cm. On each brick, a batch BPS339, a batch FPM338 and a batch of the blend are coated. For each batch, two bricks are coated with the same batch. Each batch is coated onto the brick in two passes. During the first pass, an amount of 4.2 g to 7.2 g are coated using a paint brush. In the second pass after about 5 min, an amount of 0.9 g to 3.0 g are coated onto the brick with a paint-brush.

The following table illustrates the experiments. The column "number" denominates the two different bricks for each batch. The following columns always contain two different weights denominating the weight of the coated batch during the first and the second pass.

| batches | number | m (BPS 339) | m (FPM 338) | m (blend) |
|---|---|---|---|---|
| 001, 011, 021 | 1 | 5.42 g/1.16 g | 4.33 g/0.91 g | 4.38 g/0.91 g |
|  | 2 | 6.48 g/1.08 g | 4.88 g/1.13 g | 5.20 g/1.84 g |
| 002, 012, 022 | 1 | 7.18 g/0.93 g | 6.29 g/0.98 g | 5.87 g/0.90 g |
|  | 2 | 6.73 g/1.68 g | 5.44 g/1.18 g | 6.07 g/1.38 g |
| 003, 013, 023 | 1 | 6.40 g/1.28 g | 5.53 g/0.95 g | 6.32 g/0.90 g |
|  | 2 | 6.28 g/1.20 g | 6.18 g/1.01 g | 4.88 g/1.12 g |
| 004, 014, 024 | 1 | 6.12 g/0.93 g | 5.64 g/0.91 g | 5.17 g/0.91 g |
|  | 2 | 6.47 g/1.11 g | 5.34 g/0.98 g | 6.84 g/0.93 g |
| 005, 015, 025 | 1 | 5.60 g/1.12 g | 5.08 g/1.24 g | 5.39 g/1.38 g |
|  | 2 | 6.35 g/1.20 g | 4.65 g/1.65 g | 5.36 g/1.20 g |

-continued

| batches | number | m (BPS 339) | m (FPM 338) | m (blend) |
|---|---|---|---|---|
| 006, 016, 026 | 1 | 6.75 g/0.95 g | 5.39 g/0.90 g | 6.18 g/1.04 g |
|  | 2 | 5.58 g/1.99 g | 4.85 g/1.39 g | 5.70 g/1.75 g |
| 007, 017, 027 | 1 | 6.67 g/1.15 g | 6.03 g/1.08 g | 6.07 g/0.98 g |
|  | 2 | 6.66 g/1.92 g | 5.80 g/1.10 g | 5.56 g/1.05 g |
| 008, 018, 028 | 1 | 5.65 g/0.90 g | 5.32 g/0.90 g | 5.51 g/0.99 g |
|  | 2 | 7.05 g/1.64 g | 6.18 g/1.20 g | 6.35 g/1.08 g |
| 009, 019, 029 | 1 | 6.88 g/0.92 g | 4.64 g/0.96 g | 5.82 g/0.92 g |
|  | 2 | 7.18 g/1.02 g | 5.37 g/1.60 g | 5.41 g/0.96 g |
| 010, 020, 030 | 1 | 4.57 g/0.91 g | 4.23 g/0.90 g | 4.31 g/1.16 g |
|  | 2 | 4.66 g/1.36 g | 4.83 g/1.23 g | 4.34 g/1.44 g |

After 24 h of storage at room temperature the performance tests were conducted.

Three drops of water and three drops of sunflower oil were placed on each of the three areas on each brick. After 5 min. the drops were removed by soaking the drops up with a cloth or a paper towel. The remains of each drop were rated in the following way:

0 visible stain with corona, we appearance 1 visible stain with nearly no corona, we appearance 2 visible stain, no corona 3 partial discoloration of brick 4 nearly no discoloration 5 no stain visible Examples of stains for the different ratings are shown in FIG. 1.

The sum of ratings for each stain is calculated. Three drops means a maximum of 15 achievable points for water and 15 achievable points for sunflower oil. The total score for each batch is the sum of the water- and the oil-ranking.

Following is the table of results for all batches. The column "number" denominates the brick. The three numbers in each of the following cell of the table stand for the ranking for each drop.

|  |  | BPS 339 | | FPM 338 | | blend | |
|---|---|---|---|---|---|---|---|
| batch | number | water 1/2/3 | oil 1/2/3 | water 1/2/3 | oil 1/2/3 | water 1/2/3 | oil 1/2/3 |
| 001, 011, 021 | 1 | 5/5/5 | 5/5/5 | 5/5/5 | 5/5/5 | 5/5/5 | 5/5/5 |
|  | 2 | 5/5/5 | 5/5/5 | 5/5/5 | 5/5/5 | 5/5/5 | 5/5/5 |
| 002, 012, 022 | 1 | 5/5/5 | 5/5/5 | 5/5/5 | 4/4/4 | 5/5/5 | 5/5/5 |
|  | 2 | 5/5/5 | 5/5/5 | 5/5/5 | 5/5/5 | 5/5/5 | 5/5/5 |
| 003, 013, 023 | 1 | 5/5/5 | 5/5/5 | 5/5/5 | 5/5/5 | 5/5/5 | 5/5/5 |
|  | 2 | 5/5/5 | 5/5/5 | 5/5/5 | 5/5/5 | 5/5/5 | 5/5/5 |
| 004, 014, 024 | 1 | 5/5/5 | 5/5/5 | 5/5/5 | 5/5/5 | 5/5/5 | 5/5/5 |
|  | 2 | 5/5/5 | 5/5/5 | 5/5/5 | 5/5/5 | 5/5/5 | 5/5/5 |
| 005, 015, 025 | 1 | 5/5/5 | 5/5/5 | 5/5/5 | 4/4/4 | 5/5/5 | 5/5/5 |
|  | 2 | 5/5/5 | 5/5/5 | 5/5/5 | 5/5/4 | 5/5/5 | 5/5/5 |
| 006, 016, 026 | 1 | 5/5/5 | 5/5/5 | 5/5/5 | 4/5/4 | 5/5/5 | 4/5/4 |
|  | 2 | 5/5/5 | 5/5/5 | 5/5/5 | 5/4/4 | 5/5/5 | 4/5/5 |
| 007, 017, 027 | 1 | 5/5/5 | 5/5/5 | 5/5/5 | 4/4/4 | 5/5/5 | 5/5/5 |
|  | 2 | 5/5/5 | 5/5/5 | 5/5/5 | 5/5/5 | 5/5/5 | 5/5/5 |
| 008, 018, 028 | 1 | 5/5/5 | 5/5/5 | 5/5/5 | 5/4/5 | 5/5/5 | 5/5/5 |
|  | 2 | 5/5/5 | 5/4/5 | 5/5/5 | 3/3/3 | 5/5/5 | 5/4/4 |
| 009, 019, 029 | 1 | 5/5/5 | 5/5/5 | 5/5/5 | 5/5/5 | 5/5/5 | 5/5/5 |
|  | 2 | 5/5/5 | 4/5/5 | 5/5/5 | 5/5/4 | 5/5/5 | 5/4/5 |
| 010, 020, 030 | 1 | 5/5/5 | 5/5/5 | 5/5/5 | 5/5/5 | 5/5/5 | 5/5/5 |
|  | 2 | 5/5/5 | 5/5/5 | 5/5/5 | 5/5/5 | 5/5/5 | 5/5/5 |

The following table shows the final score for each batch:

|  |  | total score | | |
|---|---|---|---|---|
| batch | number | BPS 339 | FPM 338 | blend |
| 001, 011, 021 | 1 | 30 | 30 | 30 |
|  | 2 | 30 | 30 | 30 |
| 002, 012, 022 | 1 | 30 | 27 | 30 |
|  | 2 | 30 | 30 | 30 |
| 003, 013, 023 | 1 | 30 | 30 | 30 |
|  | 2 | 30 | 30 | 30 |
| 004, 014, 024 | 1 | 30 | 30 | 30 |
|  | 2 | 30 | 30 | 30 |
| 005, 015, 025 | 1 | 30 | 27 | 30 |
|  | 2 | 30 | 29 | 30 |
| 006, 016, 026 | 1 | 30 | 28 | 28 |
|  | 2 | 30 | 28 | 29 |
| 007, 017, 027 | 1 | 30 | 27 | 30 |
|  | 2 | 30 | 30 | 30 |
| 008, 018, 028 | 1 | 30 | 29 | 30 |
|  | 2 | 29 | 24 | 28 |
| 009, 019, 029 | 1 | 30 | 30 | 30 |
|  | 2 | 29 | 29 | 29 |
| 010, 020, 030 | 1 | 30 | 30 | 30 |
|  | 2 | 30 | 30 | 30 |

From this table it can be seen that the blend reproducibly performs nearly as good as the BPS 339 by itself and much better than expected from an approximately 1:1 mixture of both different silanes.

The invention claimed is:

1. A reactive composition comprising
(a) at least two different fluorosilanes each of the same general formula I $$R_{tf}\text{—}SiX_3 \qquad \text{(formula I)},$$

wherein

X is selected from the group of alkoxy, halide, oxime, carboxyl, phenoxide and polyether, and $R_{tf}$ is a straight, branched or cyclic residue of the general formula II or III $$\text{—Y—}R_f \qquad \text{(formula II) or}$$

$$\text{—Y—}(SiR_1R_2O)_xSiR_1R_2\text{—Y—}R_f \qquad \text{(formula III)},$$

wherein

Y is a moiety selected from the group of —$(CH_2)_n$—, —$CO_2$—, —O—, —CONH—, —Ph—, —$SO_2$—, and —$SO_2NH$—, —$(CH_2)_o$—O—$(CH_2)_m$, —$(CH_2)_o$—CONH—$(CH_2)_m$, —$(CH_2)_o$—Ph—$(CH_2)_m$, —$(CH_2)_o$SO_2$—$(CH_2)_m$, —$(CH_2)_o$—$_{SO2}$NH—$(CH_2)_m$, —$SO_2$—O— and —$SO_2NH$—, wherein o is an integer from 1 to 30, m is a number in the range from 0 to 30 and, wherein n is an integer from 1 to 30, $R_f$ is a C2 to C7 linear or branched perfluoralkylene group, wherein the fluorosilanes differ in their number of carbon atoms in $R_f$ at least by 2, $R_1$ and $R_2$ are independently selected from monovalent organic residues, x is an integer from 0 to 5, and (b) and at least one aminosilane of the general formula IV $$R_a\text{—}SiR_3R_4R_5 \qquad \text{(formula IV)},$$

where $R_a$ is a straight, branched or cyclic alkyl residue comprising 1 to 7 carbon atoms and at least one primary, secondary, ternary or quaternary amino-group, $R_3$ and $R_4$ are independently selected from —$R_a$, —$OR_6$ and/or —$R_6$, and $R_5$ is —$OR_6$, and $R_6$ is a straight, branched or cyclic alkyl residue comprising 1 to 3 carbon atoms.

2. A composition according to claim 1, characterized in that the two different fluorosilanes are present in a weight ratio of the fluorosilane with an $R_f$ group with less carbon atoms to the fluorosilane with an $R_f$ group with more carbon atoms between 0.7 to 1.3.

3. A composition according to claim 1, characterized in that $R_f$ is a C4 and a C6 group for the at least two different silanes, respectively.

4. A composition according to claim 1, characterized in that X is
- a halide selected from the group of F, Br, Cl and I,
- an alkoxide $OR_7$ wherein $R_7$ is a C1 to C22 linear or branched alkylene group,
- an oxime $R_8R_9C=N-O$, wherein $R_8$ and $R_9$ are independently selected from C1 to C30 linear or branched alkylene groups, wherein $R_8$ and $R_9$ may be same or different,
- a carboxyl residue $R_{10}CO_2$ wherein $R_{10}$ is a C1 to C30 linear or branched alkylene group,
- a phenoxide M-Ph-O—, where M is hydrogen or a monovalent organic group, or
- a polyether selected from the group of polyalkylene oxides containing one or more of the following repeating structural units $(CH_2CH_2O)_q$, or $(CH_3CHCH_2O)_q$ wherein q is a value in the range from 1 to 100, terminated by a C1 to C30 linear or branched alkylene group.

5. A composition according to claim 1, characterized in that Y is a moiety selected from the group of $-(CH_2)_o-$, $-CO_2-$, $-(CH_2)_o-O-(CH_2)_m-$, $-(CH_2)_o-CONH-(CH_2)_m-$, $-(CH_2)_o-Ph-(CH_2)_m-$, $-(CH_2)_o-SO_2-(CH_2)_m-$, $-(CH_2)_o-SO_2NH-(CH_2)_m-$, $-SO_2-O-$, $-SO_2NH-$, and wherein o is a number in the range from 1 to 30 and m is a number in the range from 0 to 30.

6. A composition according to claim 1, characterized in that $R_f$ is
(a) selected from the group of $CF_3CF_2-$, $CF_3(CF_2)_3-$, $C_3F_7-$, $(CF_3)_2CF-$, $C_4F_9-$, $C_5F_{11}-$ or $C_6F_{13}-$ or
(b) a perflourinated polyether of the general formula V $$F-(CF_2)_r-(OC_3F_6)_s-(OC_2F_4)_t-(OCF_2)_u \quad \text{(formula (V))},$$

wherein r is an integer in the range from 1 to 3, and s, t, and u are independently integers in the range from 0 to 200.

7. A composition according to claim 1, characterized in that $R_1$ or $R_2$ are independently selected from the group of C1 to C30 linear or branched alkylene groups, aromatic containing groups, aminoalkyl containing groups, and fluoroalkyl containing groups.

8. A composition according to claim 1, characterized in that X, $R_3$, $R_4$, and/or $R_5$ independently are selected from the group of alkoxy groups.

9. A composition according to claim 1, characterized in that the molar ratio of $R_f$-groups of formula I to amino-groups present in formula IV is in a range from 2:1 to 6:1.

10. A composition according to claim 1, further comprising a hydrophilic silane conforming with the general formula $$R_{11}R_{12}MeSi-Y-Z \quad \text{(formula VI)},$$

where $R_{11}$ and $R_{12}$ are independently selected from the group of $R_3$ or Me, and
Z is a polar monovalent organic group.

11. A composition according to claim 1, further comprising an acid in a range between 20 and 50 wt. %.

12. A non-aqueous composition according to claim 1.

13. A process for preparing a reactive composition by combining a fluorosilane and an aminosilane each according to claim 1 followed by an acid treatment.

14. A process according to claim 13 characterized in that the fluorosilane and/or the aminosilane are reacted in protonated form.

15. A process according to claim 13 in a non-aqueous reaction system.

16. A condensation product of a fluorosilane and an aminosilane each according to claim 1, wherein the fluorosilane is of the general formula I with residues as defined in general formulas II and/or III and the aminosilane is of the general formula IV, and wherein the condensation product is obtainable by a catalytic promoted treatment of a mixture of the fluorosilane and the aminosilane.

17. A condensation product according to claim 16, characterized in that the promoted treatment comprises treatment with an acid that exhibits a $pK_a$ value in a range from 3 to 7.

18. A surface protective agent comprising the composition according to claim 1 and/or a condensation product of the composition, the surface protective agent further comprising additives for surface protective agents.

19. A surface protective agent according to claim 18, characterized in that it comprises 0.5 to 5 weight % of a compound or mixture of compounds selected from the group of silicones/siloxanes, acrylic compounds, melamine compounds, and waxes.

* * * * *